United States Patent
Chandhok et al.

(10) Patent No.: US 7,127,655 B2
(45) Date of Patent: Oct. 24, 2006

(54) METHODS AND APPARATUS TO OPTIMIZE DELIVERY OF MULTICAST CONTENT USING PROBABILISTIC FEEDBACK

(75) Inventors: Ravinder Paul Chandhok, Poway, CA (US); Paul E. Jacobs, La Jolla, CA (US); An Mei Chen, San Diego, CA (US); Thadi M. Nagaraj, San Diego, CA (US); Ben A. Saidi, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 418 days.

(21) Appl. No.: 10/801,871

(22) Filed: Mar. 14, 2004

(65) Prior Publication Data

US 2005/0157720 A1   Jul. 21, 2005

Related U.S. Application Data

(60) Provisional application No. 60/537,957, filed on Jan. 20, 2004.

(51) Int. Cl.
*H04L 1/18* (2006.01)
*G08C 25/02* (2006.01)

(52) U.S. Cl. ....................... 714/748; 714/749
(58) Field of Classification Search ......... 714/748–749
See application file for complete search history.

(56) References Cited

U.S. PATENT DOCUMENTS 6,122,483 A   9/2000  Lo et al. ............... 455/12.1
6,360,076 B1   3/2002  Segura et al. ............. 455/67.1
2005/0125549 A1*  6/2005  Katayama ................ 709/230

FOREIGN PATENT DOCUMENTS

WO      WO 01/37480 A2     5/2001

OTHER PUBLICATIONS

Nonnenmacher, J.; Biersack, E.W.; Scalable feedback for large groups; Networking, IEEE/ACM Transactions on; vol. 7, Issue 3, Jun. 1999; pp. 375-386.*

* cited by examiner

*Primary Examiner*—R. Stephen Dildine
(74) *Attorney, Agent, or Firm*—Philip R. Wadsworth; Sandip S. Minhas; Abdollah Katbab

(57) ABSTRACT

Methods and apparatus to optimize delivery of multicast content using probabilistic feedback. A method is provided for transmitting data from a server to a plurality of receiving terminals. The method includes transmitting the data from the server to the plurality of receiving terminals, and generating a random response value at each receiving terminal. The method also includes comparing the response value to an acknowledgement value at each receiving terminal, and transmitting an acknowledgment signal to the server from selected receiving terminals. The selected receiving terminals are a portion of the plurality of receiving terminals where the response value has a selected relationship to the acknowledgement value.

55 Claims, 6 Drawing Sheets

METHODS AND APPARATUS TO OPTIMIZE DELIVERY OF MULTICAST CONTENT USING PROBABILISTIC FEEDBACK

CROSS REFERENCE TO RELATED APPLICATIONS

The present application claims the benefit of priority of a co-pending U.S. Provisional Patent Application entitled, "METHODS AND APPARATUS TO OPTIMIZE DELIVERY OF MULTICAST CONTENT USING PROBABILISTIC FEEDBACK" having Ser. No. 60/537,957 and filed on Jan. 20, 2004, the disclosure of which is incorporated by reference herein in its entirety for all purposes.

BACKGROUND

The present invention relates generally to content delivery in a network environment, and more particularly, to methods and apparatus for optimized delivery of multicast content using probabilistic feedback.

DESCRIPTION OF THE RELATED ART

Data networks, such as wireless communication networks or the wired Internet, have to trade off between services customized for a single terminal and services broadcast/multicast to all terminals. The distribution of content (data) to a large number of subscribers is a complicated problem. Network systems that implement multicast or broadcast technology can deliver data over a wide area, however, it is difficult for the sender to know about the success or failure of delivery to a large number of receivers.

Among the techniques used to address this problem are forward error correction and/or repetition, where the content is processed beforehand and coded such that the likelihood of reception by all receiving terminals is very high. These solutions assume the amount of coding or repetition needed to bring the probability of reception P(r) over a population of terminals to an acceptable value can be computed in advance. Ultimately, these protocols require some amount of additional overhead in return for a higher probability of delivery success.

However, these algorithms are implemented before the data is transmitted and therefore cannot adjust for changing delivery conditions that may have either a positive or negative impact on the delivery success. Thus, systems using these algorithms may be inefficient and waste valuable bandwidth by repeatedly transmitting data that already has been successfully received.

Therefore, what is needed is a delivery system for use in a network environment that delivers content to a large number of users to provide a desired level of service, while compensating for changing delivery conditions, saving system bandwidth, and thereby providing increased efficiency over conventional systems.

SUMMARY

In one or more embodiments, methods and apparatus are provided to optimize the delivery of content in a network environment using probabilistic feedback. For example, in one embodiment, a system is provided to optimize the delivery of data transmitted in a multicast (or broadcast, henceforth included as multicast) transmission from a server to a plurality of receiving terminals. The system provides a real-time dynamic statistical sample of the delivery performance to the transmitting data server. The data server uses information about the delivery performance to determine when a desired level of service has been achieved. For example, the data server stops sending data that has already been received by enough receiving terminals as defined by the desired level of service. As a result, the data server is free to use the saved bandwidth to provide other data or services and the overall capacity of the system is increased.

In one embodiment, the data server transmits data and an acknowledgement value in a multicast transmission to a plurality of receiving terminals. Upon successful data reception, a random process is used at each terminal to generate a response value that is compared to the acknowledgement value. An acknowledgement signal is transmitted to the server from any terminal where the response value is greater than the acknowledgement value. Thus, the server receives a real-time dynamic statistical sample of the delivery performance of the transmission. The server uses this information to determine whether to re-transmit the data, or stop the transmission if enough terminals indicate that they have successfully received the data. Thus, the server is able to efficiently determine when a predetermined level of service has been achieved.

In one embodiment, apparatus is provided for use in a server to transmit data to a plurality of receiving terminals. The apparatus comprises transmitting logic to transmit the data and an acknowledgement value from the server to the plurality of receiving terminals. The apparatus also comprises receiving logic to receive an acknowledgement signal from selected receiving terminals. The selected receiving terminals comprise a portion of the plurality of receiving terminals where a locally generated random response value has a selected relationship to the acknowledgement value.

In one embodiment, a method is provided for use in a server to transmit data to a plurality of receiving terminals. The method comprises transmitting the data and an acknowledgement value from the server to the plurality of receiving terminals, and receiving an acknowledgement signal from selected receiving terminals. The selected receiving terminals comprise a portion of the plurality of receiving terminals where a locally generated random response value has a selected relationship to the acknowledgement value In one embodiment, apparatus is provided for use in a receiving terminal to receive data transmitted to a plurality of receiving terminals from a server. The apparatus comprises receiving logic to receive the data and an acknowledgement value transmitted from the server, and generating logic to generate a random response value. The apparatus also comprises processing logic to compare the response value to an acknowledgement value, and transmitting logic to transmit an acknowledgment signal to the server from the receiving terminal if the response value has a selected relationship to the acknowledgement value.

In one embodiment, a method is provided for use in a receiving terminal to receive data transmitted to a plurality of receiving terminals from a server. The method comprises receiving the data and an acknowledgement value transmitted from the server, generating a random response value, comparing the response value to the acknowledgement value, and transmitting an acknowledgment signal to the server if the response value has a selected relationship to the acknowledgement value.

In one embodiment, apparatus is provided for use in a receiving terminal to receive data transmitted to a plurality of receiving terminals from a server. The apparatus comprises receiving logic to receive the data and an acknowledgement value transmitted from the server, and wherein the receiving logic operates to detect a data reception error. The apparatus also comprises generating logic to generate a random response value, and processing logic to compare the response value to an acknowledgement value. The apparatus also comprises transmitting logic to transmit a negative acknowledgment signal to the server from the receiving terminal if a data reception error is detected and the response value has a selected relationship to the acknowledgement value.

Other aspects, advantages, and features of the present invention will become apparent after review of the hereinafter set forth Brief Description of the Drawings, Detailed Description of the Invention, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes embodiments of a data delivery system that operate to efficiently deliver data from a transmitting server to a large number of terminals. The system is suitable for use in any type of wired or wireless network, including but not limited to, communication networks, public networks, such as the Internet, private networks, such as virtual private networks (VPN), local area networks, wide area networks, long haul network, or any other type of data network.

Figure 1:
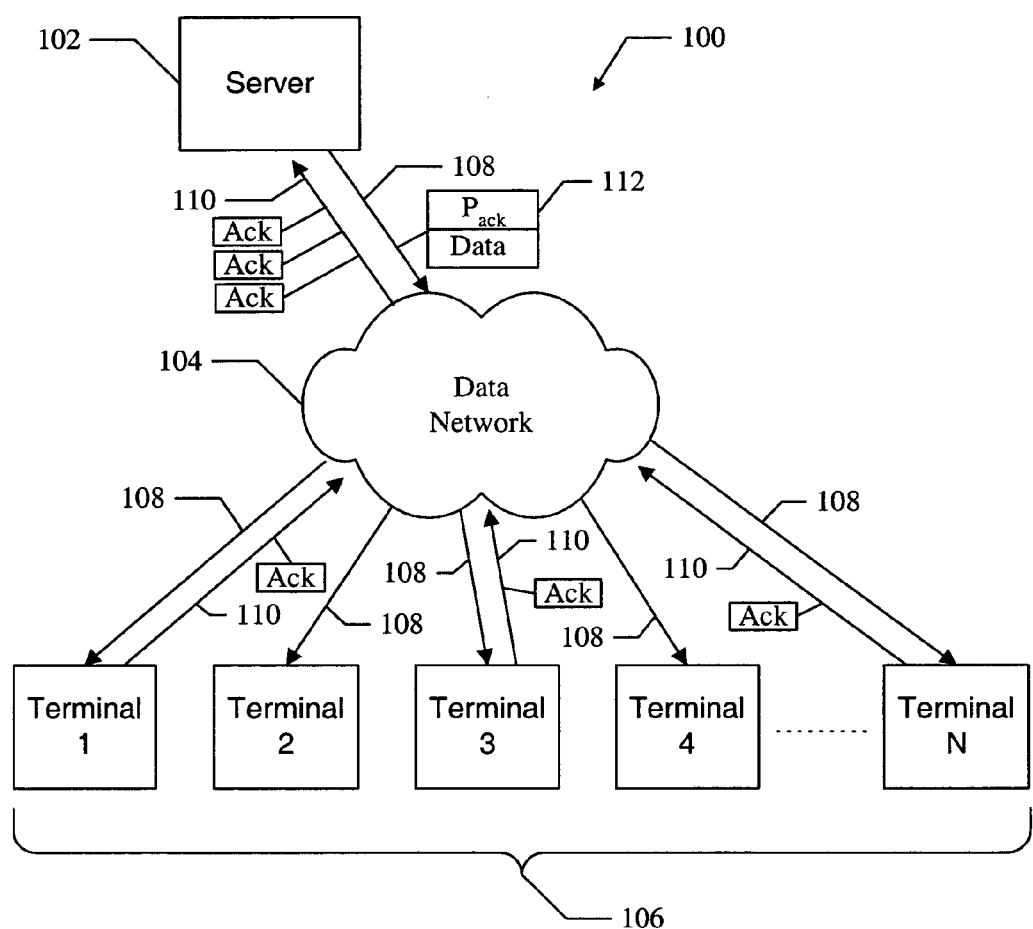
FIG. 1 shows a data network that comprises one embodiment of a data delivery system.

FIG. 1 shows a data network 100 that comprises one embodiment of a data delivery system. The network 100 comprises a server 102, a data network 104, and terminals (1 thru N), as shown at 106. The data network 104 may be any type of wired or wireless network that allows data to be transmitted from the server 102 to the terminals 106. The network 104 also provides reverse communication channels so that any of the terminals 106 may transmit data or other information to the server 102.

In one or more embodiments, the delivery system exploits the availability of the reverse channels (from terminals to server) to receive feedback information that is used to provide the efficient multicast of data on the available forward channels (from server to terminals). For a selected system capacity, a probability acknowledgement value ($P_{ack}$) is set. The $P_{ack}$ value is transmitted along with the data so that each receiving terminal receives it. For example, package 112 contains data and a $P_{ack}$ value. Paths 108 illustrate the transmission of the package 112 from the server 102 to the receiving terminals 106.

Upon reception of the package 112, each receiving terminal uses the $P_{ack}$ value to decide whether or not to acknowledge a successful data delivery. In one embodiment, each receiving terminal compares the $P_{ack}$ value to a locally generated random response value (P) to determine whether or not to acknowledge the data delivery. For example, the relationship between the value P and the Pack value is used to determine whether or not to acknowledge the data delivery. The value P may be less than, equal to, or greater than the Pack value. In one embodiment, if the value P is greater than the $P_{ack}$ value, then an acknowledgement signal (Ack) is transmitted back to the server 102. As a result, a subset of the receiving terminals 106 (i.e. where P>Pack) will send the acknowledgement signal (Ack) to the transmitting server 102 via the available reverse channels. For example, as shown in FIG. 1, the terminals 1, 3, and N transmit the acknowledgement signal (Ack) to the server 102 using reverse channels, as illustrated by paths 110.

The acknowledgement signals (Ack) transmitted from the subset of the receiving terminals (i.e., terminals 1, 3, and N) form a statistically sampled response. The server 102 then uses this statistically sampled response to terminate the data transmission when it is determined that enough terminals have received the data so that a probability of reception ($P_r$) has been satisfied (i.e., a desired level of service has been provided). It should be noted that there need be no direct relationship between $P_r$ and $P_{ack}$, since $P_{ack}$ is set relative to the number of terminals that are to receive the multicast data transmission, and $P_r$ is based on a service level decision. However, it is desirable that $P_{ack}$ be such that a statistically significant number of acknowledgement responses (Ack) are delivered to the transmitting server 102.

It should be noted that the value $P_{ack}$ could be sent to the receiving terminals in any number of ways. For example, as described above, the value $P_{ack}$ is transmitted with the data. In another embodiment, the value $P_{ack}$ may be transmitted in a separate communication to the terminals or transmitted using an out-of-band channel, such as a paging or control channel. Thus, any suitable technique can be used to provision the receiving terminals with the $P_{ack}$ value.

Figure 2:
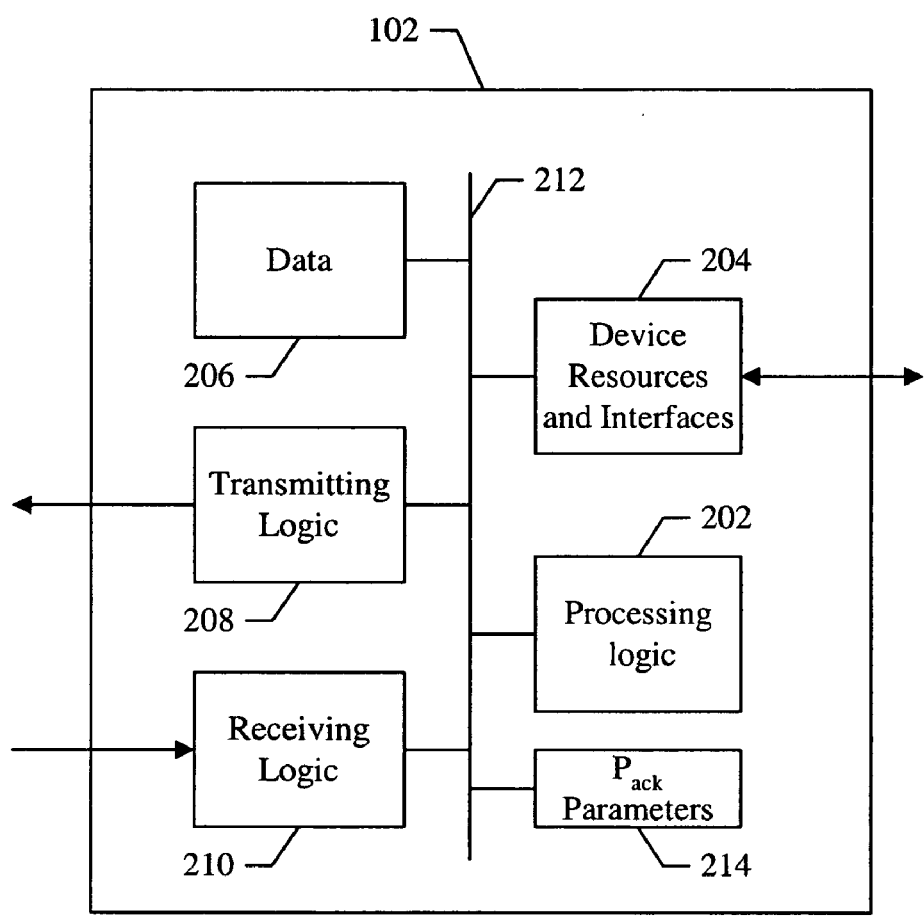
FIG. 2 shows a detailed diagram of a transmitting server that includes one embodiment of a data delivery system.

FIG. 2 shows a functional block diagram of the server 102 comprising one embodiment of a data delivery system. The server 102 comprises processing logic 202, device resources 204, data 206, transmitting logic 208, and receiving logic 210, all coupled to an internal data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions.

The device resources and interfaces 204 comprise hardware and/or software that allow the server 102 to communication with internal and external systems. For example, internal systems may include mass storage systems, memory, display driver, modem, or other internal device resources. The external systems may include user interface devices, printers, disk drives, or other local devices or systems.

The data 206 represents data to be transmitted to one or more terminals. For example, the data 206 may comprise multimedia content stored in any type of memory device. In one embodiment, the server 102 operates to perform a multicast transmission of the data 206 so that the data may be received by a desired number of receiving terminals.

The transmitting logic 208 comprises hardware and/or software that operates to allow the server 102 to transmit data and other information to external devices or systems. For example, the transmitting logic may comprise logic to transmit data and/or other information over a data network to other devices, such as receiving terminals. For example, the server 102 may use the transmitting logic 208 to transmit a multicast transmission over a data network to a plurality of receiving terminals.

The receiving logic 210 comprises hardware and/or software that operates to allow the server 102 to receive data and other information from external devices. For example, the receiving logic interfaces to a data network to allow the server 102 to receive data transmitted over reverse channels from terminal devices.

The server 102 also includes probability acknowledgement parameters ($P_{ack}$) 214 (or values) coupled to the internal data bus 212 that are used to determine a statistically sampled response from terminals that receive data transmitted from the server 102. In one embodiment, the $P_{ack}$ parameters have a range between zero and one. Each multicast transmission of data from the server 102 has an associated $P_{ack}$ parameter. The receiving terminals use the $P_{ack}$ value to determine whether or not to transmit an acknowledgement signal (Ack) to the server 102. For example, in one embodiment, if the transmitted $P_{ack}$ parameter is zero, then all receiving terminals would provide an acknowledgement signal (Ack) to the server 102 in response to receiving the transmitted data. Alternatively, if the $P_{ack}$ parameter is one, then no receiving terminal would provide an acknowledgement signal (Ack) to the server 102. Preferably, the transmitted $P_{ack}$ parameter is set so that a statistically significant number of receiving terminals transmit an acknowledgement signal (Ack) to the server 102.

During operation of the server 102, the data 206 is multicast over a data network via the transmitting logic 208 to a number to receiving terminals. The data 206 is transmitted in a package that includes a selected $P_{ack}$ parameter. Once the package is received at each receiving terminal, a test is performed to determine if the terminal should transmit an acknowledgement signal (Ack) back to the server 102. The decision is based on the $P_{ack}$ parameter and a response value (P) generated at each terminal. As a result, the server 102 receives Ack signals from a subset of the receiving terminals. The server then uses this information to determine if a selected probability of reception ($P_r$) has been satisfied.

In one embodiment, the data delivery system comprises program instructions stored on a computer-readable media, which when executed by the processing logic 202, provides the functions of the server 102 described herein. For example, instructions may be loaded into the server 102 from a computer-readable media, such as a floppy disk, CDROM, memory card, FLASH memory device, RAM, ROM, or any other type of memory device or computer-readable media that interfaces to the server 102 via the device resources 204. In another embodiment, the instructions may be downloaded into the server 102 from a network resource that interfaces to the sever 102 via the receiving logic 210. The instructions, when executed by the processing logic 202, provide one or more embodiments of a data delivery system as described herein.

Figure 3:
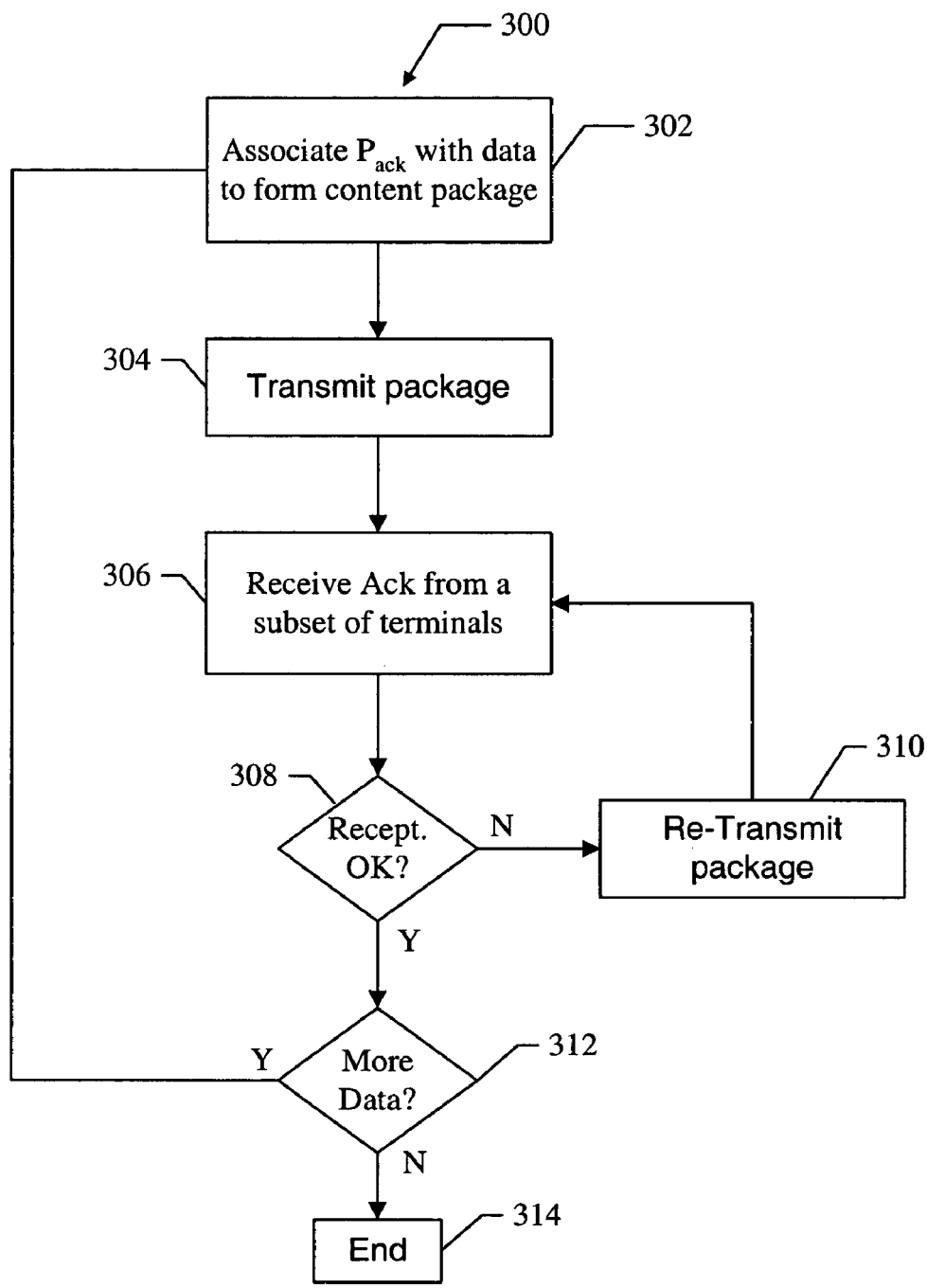
FIG. 3 shows one embodiment of a method for operating the server of FIG. 2.

FIG. 3 shows a method 300 that illustrates the operation of one embodiment of a data delivery system. For clarity, the method 300 will be described with reference to the server 102 shown in FIG. 2. In one or more embodiments, the processing logic 202 executes program instructions to perform the functions described below.

During initialization of the delivery system, a selected probability of reception ($P_r$) is defined for multicast transmissions. For example, a value for $P_r$ is entered through a user input via the device interfaces 204, or downloaded to the server 102 via the receiving logic 210. In one embodiment, the value for $P_r$ is stored at the processing logic 202.

At block 302, a package is created that comprises data and a selected $P_{ack}$ parameter. The package is to be multicast transmitted to a number of receiving terminals. For example, in one embodiment, the processing logic 202 combines a selected $P_{ack}$ parameter 214 with a selected portion of the data 206 to form the package. The $P_{ack}$ parameter 214 is included in a header portion of the package.

At block 304, the package is multicast transmitted to the receiving terminals. For example, the processing logic 202 controls the transmitting logic 208 to multicast transmit the package to the receiving terminals via a data network, such as the network 104. The receiving terminals receiving the package and determine whether or not to response with an Ack signal to the server 102

At block 306, the transmitting server receives Ack signals from a subset of receiving terminals. For example, a subset of the receiving terminals determines from the $P_{ack}$ value in the package that they are to transmit an Ack signal to the transmitting server 102. The subset terminals transmit the Ack signal to the server 102 using the reverse channel associated with the data network.

At block 308, a test is performed to determine if the desired number of receiving terminals received the multicast transmission. For example, the server 102 uses the number of Ack signals received to determine if the number of receiving terminals meets the selected probability of reception ($P_r$) as defined during initialization. In one embodiment, the processing logic 202 knows the total number of multicast receiving terminals and uses the Ack signals to statistically determine how many of those terminals successfully received the data.

Due to transmission conditions and other variables, not all of the possible receiving terminals are able to receive the transmission. As a result, the number of terminals in the subset of terminals that actually transmit an Ack signal may be smaller than anticipated. Using known statistical analysis techniques, the processing logic 202 determines whether the selected probability of reception ($P_r$) has been satisfied based on the total possible number of receiving terminals and the number of received Ack signals. The processing logic 202 may also adjust the $P_{ack}$ value for future transmissions to cause more or less receiving terminals to transmit an Ack signal.

If the selected probability of reception ($P_r$) has been satisfied, the method proceeds to block 312, and if not, the method proceeds to block 310.

At block 310, the package is re-transmitted because it was determined at block 308 that not enough of the receiving terminals received the multicast transmission. After re-transmission, the method proceeds to block 306 where Ack signals are again received from a subset of the receiving terminals.

At block 312, a test is performed to determine if more data is to be multicast transmitted. For example, a large block of data may be multicast transmitted in a string of smaller packages. If more data is to be transmitted, the method proceeds to block 302, and if not, the method ends at block 314.

It should be noted that the flow diagram 300 illustrates just one embodiment and that changes, additions, or rearrangements of the flow elements may be made without deviating from the scope of the invention.

Figure 4:
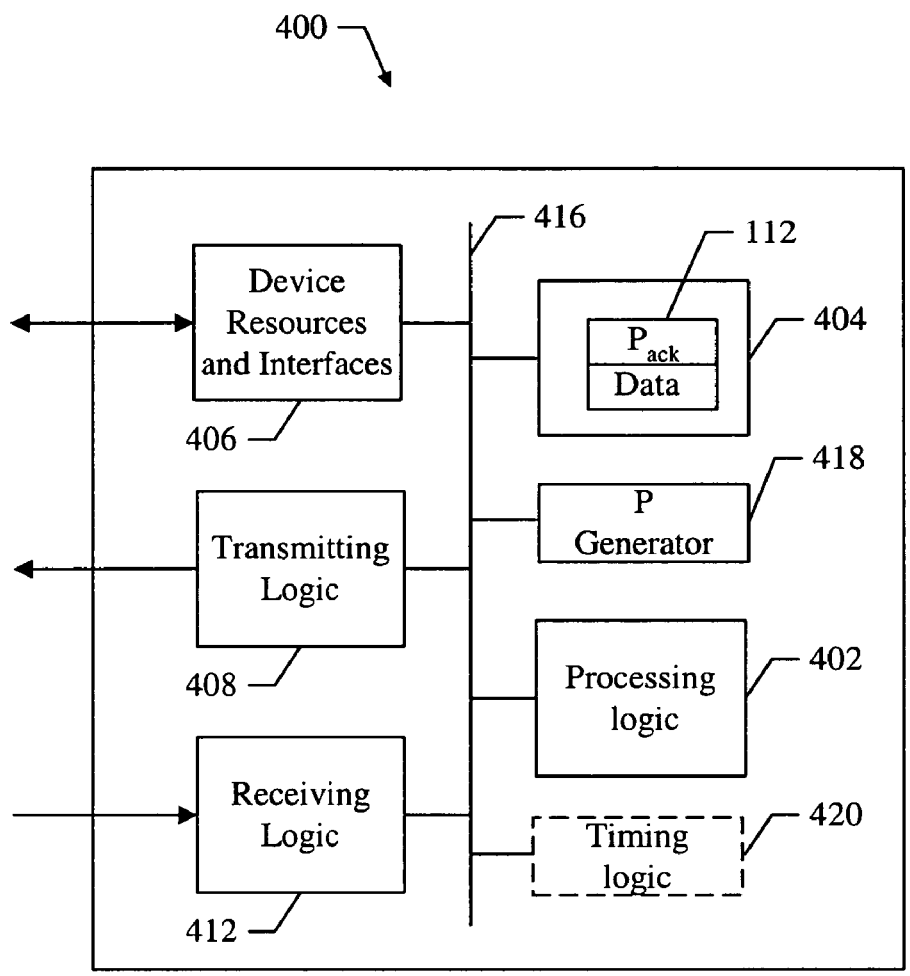
FIG. 4 shows a functional block diagram of a receiving terminal comprising one embodiment of a data delivery system.

FIG. 4 shows a functional block diagram of a receiving terminal 400 comprising one embodiment of a data delivery system. The terminal 400 comprises processing logic 402, memory 404, device resources and interfaces 406, transmitting logic 408 and receiving logic 412, all coupled to a data bus 416.

In one or more embodiments, the processing logic 402 comprises a CPU, processor, gate array, hardware logic, memory elements, virtual machine, software, and/or any combination of hardware and software. Thus, the processing logic 402 generally comprises logic to execute machine-readable instructions.

The device resources and interfaces 406 comprise hardware and/or software that allow the terminal 400 to communication with internal and external systems. For example, internal systems may include mass storage systems, memory, display driver, modem, or other internal device resources. The external systems may include user interface devices, printers, disk drives, or other local devices or systems.

The transmitting logic 408 comprises hardware and/or software that operates to allow the terminal 400 to transmit data and other information to external devices or systems. For example, the transmitting logic may comprise logic to transmit data and/or other information over a data network to other devices, such as server. For example, the processing logic 402 may use the transmitting logic 408 to transmit an Ack signal over a reverse channel in a data network to a server.

The receiving logic 412 comprises hardware and/or software that operates to allow the terminal 400 to receive data and other information from external devices. For example, the receiving logic 412 interfaces to a data network to allow the terminal 400 to receive data transmitted in a multicast transmission from a server.

The memory 404 comprises logic to store information at the terminal 400. For example, the terminal 400 may receive a package 112 that was transmitted in a multicast transmission from a server, and store the package 112 in the memory 404 for further processing.

The terminal 400 also comprises a response value (P) generator 418. The generator 418 comprises any combination of hardware and software to generate the response value (P). For example, in one embodiment, the generator 418 comprises a random number generator that operates to generate a random number between zero and one for the response value P.

The terminal 400 may optionally comprise timing logic 420 that operates to measure predetermined time periods or random time intervals. The timing logic is coupled to the data bus 416 and comprises any combination of hardware and software. In one embodiment, the processing logic 402 may control the operation of the timing logic 420 via the data bus 416. For example, the processing logic 402 may operate to set, reset, activate, deactivate, clear or otherwise control the timing logic to measure selected time intervals. For example, the processing logic 402 may control the timing logic to measure random time intervals by presetting random start values into the timing logic 420 and receiving a completion signal from the timing logic 420 when the time interval has expired.

During operation, the terminal 400 operates to receive multicast data transmissions, and in response, determines whether or not to transmit an acknowledgement signal (Ack) to the transmitting server. For example, the package 112 is received by the terminal 400 and stored in the memory 404. The package 112 contains a $P_{ack}$ value and data transmitted by a server, for example the server 102. The terminal 400 then generates a response value P using the generator 418, and the processing logic 402 compares the value P to the $P_{ack}$ value to determine the relationship between the two values. The relationship is used to determine whether or not to transmit the Ack signal. For example, the value P may be greater than, equal to, or less than the Pack value. If the desired relationship between the values exists, the processing logic 402 will cause the transmitting logic 408 to transmit the Ack signal over the reverse channel to the transmitting server. The transmitting server uses the Ack signals received from the receiving terminals to determine whether or not the multicast data transmission satisfies a selected probability of reception ($P_r$).

In one embodiment, the data delivery system comprises program instructions stored on a computer-readable media, which when executed by the processing logic 402, provides the functions of the terminal 400 described herein. For example, instructions may be loaded into the terminal 400 from a computer-readable media, such as a floppy disk, CDROM, memory card, FLASH memory device, RAM, ROM, or any other type of memory device or computer-readable media that interfaces to the terminal 400 via the device resources 406. In another embodiment, the instructions may be downloaded into the terminal 400 from a network resource that interfaces to the terminal 400 via the receiving logic 412. The instructions, when executed by the processing logic 402, provide one or more embodiments of a data delivery system as described herein.

Figure 5:
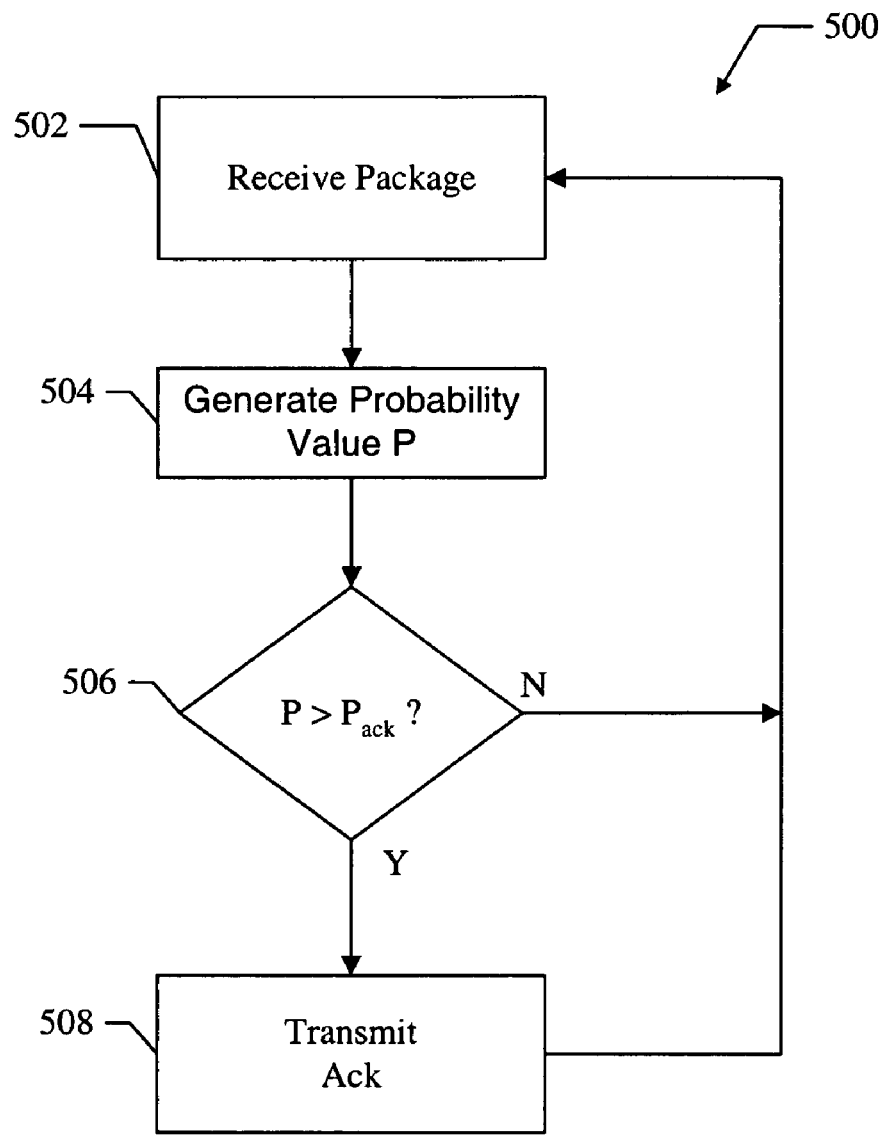
FIG. 5 shows one embodiment of a method for operating the receiving terminal of FIG. 4.

FIG. 5 shows a method 500 that illustrates the operation of one embodiment of a data delivery system. For clarity, the method 500 will be described with reference to the terminal 400 shown in FIG. 4. In one or more embodiments, the processing logic 402 executes program instructions to perform the functions described below.

At block 502, a package transmitted as part of a multicast transmission is successfully received at the terminal. For example, the package 112 is received at the terminal 400 via the receiving logic 412.

At block 504, a random response value P is generated. For example, the processing logic 402 controls the generator 418 to generate the random response value P. In one embodiment, the value P is a random value in the range of zero to one.

At block 506, a test is performed to determine if the response value P is greater than the $P_{ack}$ value included in the package. For example, the transmitting server includes the $P_{ack}$ value in the package before transmission. The processing logic 402 retrieves the $P_{ack}$ value from the received package and compares it to the value P generated by the generator 418. In one embodiment, the processing logic includes compare logic that operates to determine the relationship between the two values. Any relationship between the response value P and the Pack value can be used to determine whether or not an Ack signal is transmitted. In one embodiment, if the value of P is greater than the value of $P_{ack}$, then an acknowledgement is required and the method proceeds to block 508. If the value of P is less than or equal to the value of $P_{ack}$, then no acknowledgement is required and the method proceeds back to block 502 to receive the next package.

At block 508, the terminal transmits an acknowledgement signal (Ack) to the transmitting server to indicate that the package was successfully received. For example, the Ack signal may be any type of acknowledgement signal or message. In one embodiment, the processing logic 402 controls the transmitting logic 408 to transmit the Ack signal to the server via the available reverse channel. Thus, the server is notified that the terminal has successfully received the transmitted package.

It should be noted that the method 500 illustrates just one embodiment and that changes, additions, or rearrangements of the flow elements may be made without deviating from the scope of the invention.

In another embodiment, the $P_{ack}$ value is changed to a $P_{nack}$ value. The receiving terminals use the $P_{nack}$ value to determine whether or not to transmit a "negative acknowledgement" (Nack) signal to the server if the data was not successfully received. For example, if there is a transmission error or some other event that prevents the successful reception of data, the receiving terminal(s) may transmit the negative acknowledgement (Nack) to the server to indicate that the data transmission failed. The $P_{nack}$ value is used by the receiving terminals to determine whether or not to transmit the negative acknowledgement signal (Nack), so that the server will receive a statistically significant number of Nack signals to be able to determine the probability of reception P(r). For example, by knowing how many terminals failed to receive the data it is possible to determine how many terminals successfully received the data and therefore the probability of reception P(r).

Figure 6:
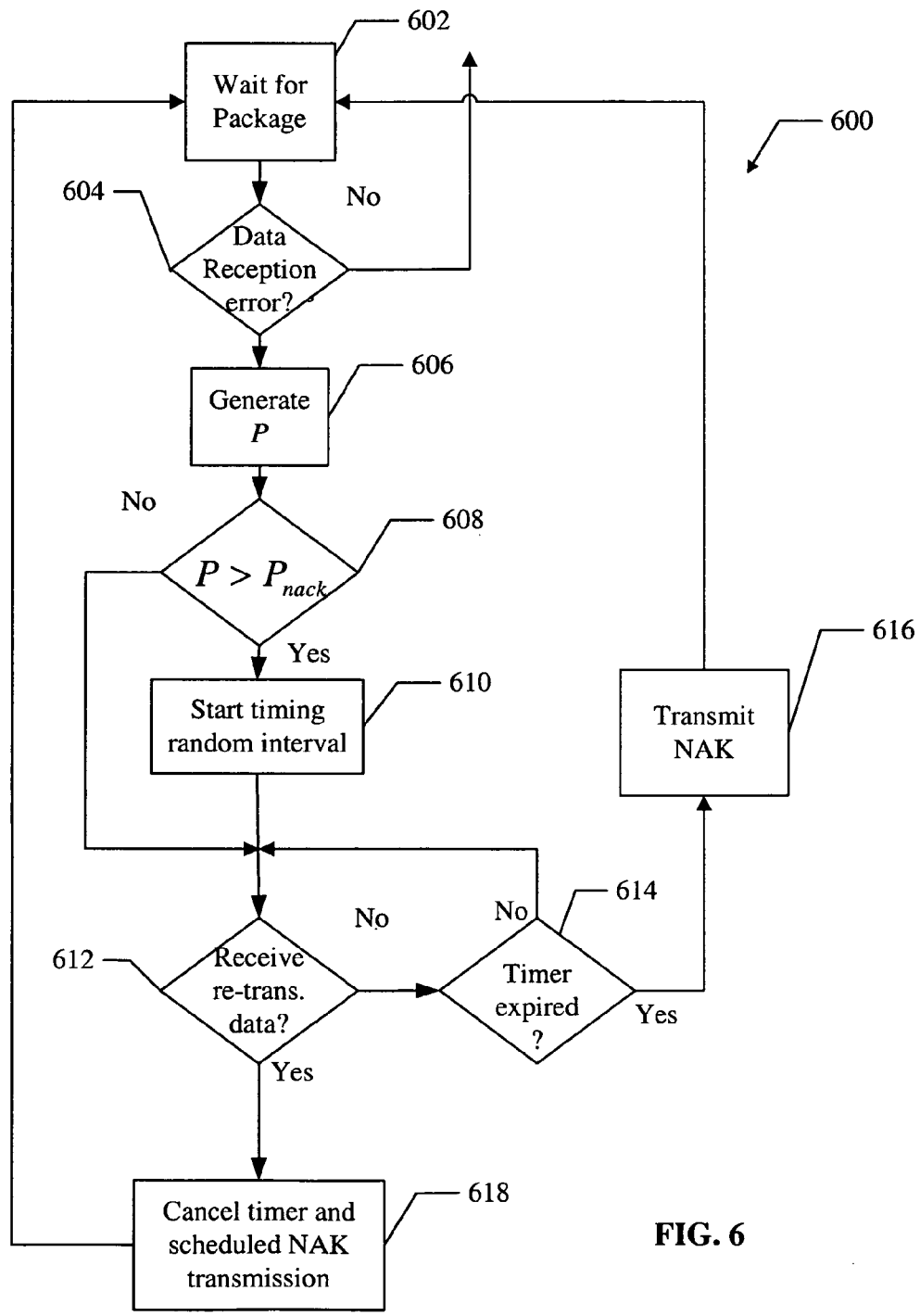
FIG. 6 shows a method that illustrates the operation of a receiving terminal to provide a negative acknowledgement signal in one embodiment of a data delivery system.

FIG. 6 shows a method 600 that illustrates the operation of receiving terminals to provide a negative acknowledgement signal in one embodiment of a data delivery system. For the description of the method 600, it will be assumed that the transmitting server includes a $P_{nack}$ value in a package of data that is multicast transmitted to a number of receiving terminals.

At block 602, the receiving terminal waits for a package to arrive. The package contains data and the $P_{nack}$ value.

At block 604, a package arrives and a test is performed to determine if the package has been successfully received. For example, the receiving terminal determines if there has been a data reception error or some other error that has resulted in the unsuccessful reception of data. If the data is successfully received, the method proceeds to block 602 to wait for the next package. If the data is not successfully received, the method proceeds to block 606.

At block 606, the receiving terminal generates a response value P. For example, the processing logic 402 controls the generator 418 to generate the value P. In one embodiment, the generator 418 generates a random number for the value P.

At block 608, a test is performed to determine if the value P is greater than the $P_{nack}$ value. For example, the processing logic 402 comprises compare logic that compares the two values. If the value P is not greater than the value Pnack, the method proceeds to block 612. If the value P is greater than the value Pnack, the method proceeds to block 610.

At block 610, the measurement of a random time interval is started. For example, the processing logic 402 controls the timing logic 420 to measure a random time interval. The time interval is used to schedule the transmission of a Nack signal from the receiving terminal to the transmitting server. The time interval may be selected to be any time interval, however, in one embodiment, the time interval is randomly selected at each receiving device. As a result, it will be highly unlikely that each receiving device will schedule a Nack transmission to occur at exactly the same time. Thus, the reverse link and the transmitting server will not be flooded with Nack transmissions if a large number of data reception errors occur.

At block 612, a test is performed to determine if data has been retransmitted from the transmitting server. For example, the server may have re-transmitted the data based on one or more Nacks received from other receiving terminals. If the data has been received in a retransmission, the method proceeds to block 618. If the data has not been received in a re-transmission, the method proceeds to block 614.

At block 618, as a result of the data being received in a re-transmission, the operation of the timer is terminated and the scheduled Nack transmission is canceled. For example, the processing logic 402 controls the timing logic 420 to stop operation. The method proceeds to block 602 to wait for the next package.

At block 614, a test is performed to determine if the selected time interval has expired. For example, the timing logic 420 measures the selected time interval and then signals the processing logic 402 that the time internal has expired.

At block 616, the receiving terminal transmits a Nack signal to the server via the available reverse channel at the expiration of the time interval. For example, the processing logic 402 controls the transmitting logic 408 to transmit the Nack signal to the server. The Nack signal notifies the server that the transmitted data was not successfully received. The server may then operate to re-transmit the data if it desires. For example, the server may use the number of received Nack signals to determine a probability of reception (Pr) and use that information to determine if it should re-transmit the data.

It should be noted that the method 600 illustrates just one embodiment and that changes, additions, or rearrangements of the flow elements may be made without deviating from the scope of the invention.

In another embodiment of the method 600, it is possible to have multicast transmissions on the reverse link. In this embodiment, each terminal can monitor (or hear) other terminals transmitting Nack signals on the reverse link. Thus, a terminal would start timing a random interval (block 610) if it does not receive the data successfully as determined at blocks 602 through 608. At block 612, a test is performed to determine if data has been retransmitted from the transmitting server. However, the test a block 612 would also test to determine if the terminal detects (or hears) one or more other terminals transmitting Nack signals due to reception errors. If the terminal detects that other terminals are already transmitting Nack signals, then the method proceeds to block 618 where the timer and scheduled Nack transmissions are canceled. Since this terminal has detected that there are other terminals already requesting re-transmission of the data, it is not necessary for this terminal to further congest the transmission channels with additional Nack transmissions.

Accordingly, while one or more embodiments of methods and apparatus for a data delivery system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. Apparatus for use in a server to transmit data to a plurality of receiving terminals, the apparatus comprising:
   transmitting logic to transmit the data and an acknowledgement value from the server to the plurality of receiving terminals; and receiving logic to receive an acknowledgement signal from selected receiving terminals, wherein the selected receiving terminals comprise a portion of the plurality of receiving terminals where a locally generated random response value has a selected relationship to the acknowledgement value.

2. The apparatus of claim 1, wherein the transmitting logic further comprises logic to transmit the acknowledgement value to the plurality of receiving terminals using an out of band transmission.

3. The apparatus of claim 1, wherein the selected relationship occurs when the response value is greater than the acknowledgement value.

4. The apparatus of claim 1, wherein the processing logic further comprises logic to use the acknowledgement signals transmitted from the selected receiving terminals to determine a probability of reception.

5. The apparatus of claim 4, wherein the processing logic further comprises logic to re-transmit the data from the server if the probability of reception is below a selected service level.

6. The apparatus of claim 4, wherein the processing logic further comprises logic to terminate the transmission of the data from the server if the probability of reception is above a selected service level.

7. The apparatus of claim 1, wherein the processing logic further comprises logic to adjust the acknowledgement value to adjust the number of acknowledgement signals received at the server.

8. The apparatus of claim 1, wherein the transmitting logic further comprises logic to transmit the data from the server to the plurality of receiving terminals using a multicast transmission.

9. A method for use in a server to transmit data to a plurality of receiving terminals, the method comprising:
transmitting the data and an acknowledgement value from the server to the plurality of receiving terminals; and
receiving an acknowledgement signal from selected receiving terminals, wherein the selected receiving terminals comprise a portion of the plurality of receiving terminals where a locally generated random response value has a selected relationship to the acknowledgement value.

10. The method of claim 9, further comprising transmitting the acknowledgement value to the plurality of receiving terminals using an out of band transmission.

11. The method of claim 9, wherein the selected relationship occurs when the response value is greater than the acknowledgement value.

12. The method of claim 9, further comprising using the acknowledgement signals transmitted from the selected receiving terminals to determine a probability of reception.

13. The method of claim 12, further comprising re-transmitting the data from the server if the probability of reception is below a selected service level.

14. The method of claim 12, further comprising terminating the transmission of the data from the server if the probability of reception is above a selected service level.

15. The method of claim 9, further comprising adjusting the acknowledgement value to adjust the number of acknowledgement signals received at the server.

16. The method of claim 9, further comprising transmitting the data from the server to the plurality of receiving terminals using a multicast transmission.

17. Apparatus for use in a server to transmit data to a plurality of receiving terminals, the method comprising:
means for transmitting the data and an acknowledgement value from the server to the plurality of receiving terminals; and
means for receiving an acknowledgement signal from selected receiving terminals, wherein the selected receiving terminals comprise a portion of the plurality of receiving terminals where a locally generated random response value has a selected relationship to the acknowledgement value.

18. The apparatus of claim 17, further comprising means for transmitting the acknowledgement value to the plurality of receiving terminals using an out of band transmission.

19. The apparatus of claim 17, wherein the selected relationship occurs when the response value is greater than the acknowledgement value.

20. The apparatus of claim 17, further comprising means for using the acknowledgement signals transmitted from the selected receiving terminals to determine a probability of reception.

21. The apparatus of claim 20, further comprising means for re-transmitting the data from the server if the probability of reception is below a selected service level.

22. The apparatus of claim 20, further comprising means for terminating the transmission of the data from the server if the probability of reception is above a selected service level.

23. The apparatus of claim 17, further comprising means for adjusting the acknowledgement value to adjust the number of acknowledgement signals received at the server.

24. The apparatus of claim 17, further comprising means for transmitting the data from the server to the plurality of receiving terminals using a multicast transmission.

25. A computer-readable media comprising instructions, which when executed by processing logic in a server, operate to transmit data to a plurality of receiving terminals, the computer-readable media comprising:
instructions for transmitting the data and an acknowledgement value from the server to the plurality of receiving terminals; and
instructions for receiving an acknowledgement signal from selected receiving terminals, wherein the selected receiving terminals comprise a portion of the plurality of receiving terminals where a locally generated random response value has a selected relationship to the acknowledgement value.

26. The computer-readable media of claim 25, further comprising instructions for transmitting the acknowledgement value to the plurality of receiving terminals using an out of band transmission.

27. The computer-readable media of claim 25, wherein the selected relationship occurs when the response value is greater than the acknowledgement value.

28. The computer-readable media of claim 25, further comprising instructions for using the acknowledgement signals transmitted from the selected receiving terminals to determine a probability of reception.

29. The computer-readable media of claim 28, further comprising instructions for re-transmitting the data from the server if the probability of reception is below a selected service level.

30. The computer-readable media of claim 28, further comprising instructions for terminating the transmission of the data from the server if the probability of reception is above a selected service level.

31. The computer-readable media of claim 25, further comprising instructions for adjusting the acknowledgement value to adjust the number of acknowledgement signals received at the server.

32. The computer-readable media of claim 25, further comprising instructions for transmitting the data from the server to the plurality of receiving terminals using a multicast transmission.

33. Apparatus for use in a receiving terminal to receive data transmitted to a plurality of receiving terminals from a server, the apparatus comprising:
- receiving logic to receive the data and an acknowledgement value transmitted from the server;
- generating logic to generate a random response value;
- processing logic to compare the response value to an acknowledgement value; and
- transmitting logic to transmit an acknowledgment signal to the server from the receiving terminal if the response value has a selected relationship to the acknowledgement value.

34. The apparatus of claim 33, wherein the receiving logic further comprises logic to receive the acknowledgement value using an out of band transmission.

35. The apparatus of claim 33, wherein the selected relationship occurs when the response value is greater than the acknowledgement value.

36. The apparatus of claim 33, wherein the receiving logic further comprises logic to receive the data in a multicast transmission from the server.

37. A method for use in a receiving terminal to receive data transmitted to a plurality of receiving terminals from a server, the method comprising:
- receiving the data and an acknowledgement value transmitted from the server;
- generating a random response value;
- comparing the response value to the acknowledgement value; and
- transmitting an acknowledgment signal to the server if the response value has a selected relationship to the acknowledgement value.

38. The method of claim 37, further comprising receiving the acknowledgement value using an out of band transmission.

39. The method of claim 37, wherein the selected relationship occurs when the response value is greater than the acknowledgement value.

40. The method of claim 37, further comprising receiving the data in a multicast transmission from the server.

41. Apparatus for use in a receiving terminal to receive data transmitted to a plurality of receiving terminals from a server, the apparatus comprising:
- means for receiving the data and an acknowledgement value transmitted from the server;
- means for generating a random response value;
- means for comparing the response value to the acknowledgement value; and
- means for transmitting an acknowledgment signal to the server if the response value has a selected relationship to the acknowledgement value.

42. The apparatus of claim 41, further comprising means for receiving the acknowledgement value using an out of band transmission.

43. The apparatus of claim 41, wherein the selected relationship occurs when the response value is greater than the acknowledgement value.

44. The apparatus of claim 41, further comprising means for receiving the data in a multicast transmission from the server.

45. A computer-readable media comprising instructions, which when executed by processing logic in a receiving terminal, operate to receive data transmitted from a server to a plurality of receiving terminals, the computer-readable media comprising:
- instructions for receiving the data and an acknowledgement value transmitted from the server;
- instructions for generating a random response value;
- instructions for comparing the response value to the acknowledgement value; and
- instructions for transmitting an acknowledgment signal to the server if the response value has a selected relationship to the acknowledgement value.

46. The computer-readable media of claim 45, further comprising instructions for receiving the acknowledgement value using an out of band transmission.

47. The computer-readable media of claim 45, wherein the selected relationship occurs when the response value is greater than the acknowledgement value.

48. The computer-readable media of claim 45, further comprising instructions for receiving the data in a multicast transmission from the server.

49. Apparatus for use in a receiving terminal to receive data transmitted to a plurality of receiving terminals from a server, the apparatus comprising:
- receiving logic to receive the data and an acknowledgement value transmitted from the server, and wherein the receiving logic operates to detect a data reception error;
- generating logic to generate a random response value;
- processing logic to compare the response value to an acknowledgement value; and
- transmitting logic to transmit a negative acknowledgment signal to the server from the receiving terminal if a data reception error is detected and the response value has a selected relationship to the acknowledgement value.

50. The apparatus of claim 49, wherein the receiving logic further comprises logic to receive the acknowledgement value using an out of band transmission.

51. The apparatus of claim 49, wherein the selected relationship occurs when the response value is greater than the acknowledgement value.

52. The apparatus of claim 49, wherein the receiving logic further comprises logic to receive the data in a multicast transmission from the server.

53. The apparatus of claim 49, further comprising timing logic that is operable to measure a selected time interval.

54. The apparatus of claim 53, wherein the transmitting logic transmits the negative acknowledgement signal at the end of the selected time interval.

55. The apparatus of claim 54, wherein the selected time interval is a random time interval.

* * * * *